Dec. 17, 1929.  J. A. WRIGHT  1,739,535
VEHICLE CONSTRUCTION
Filed Nov. 8, 1926     3 Sheets-Sheet 3
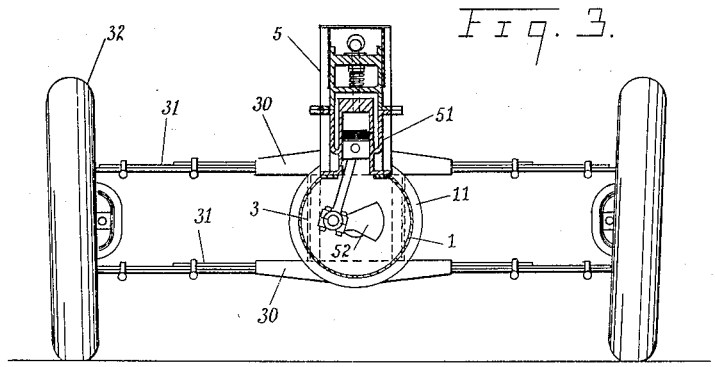
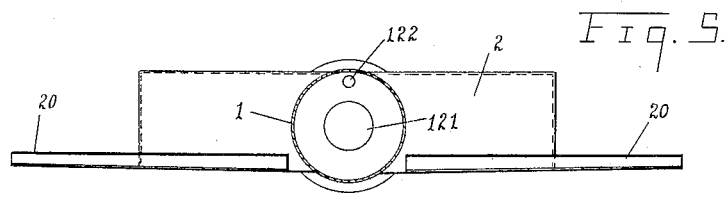
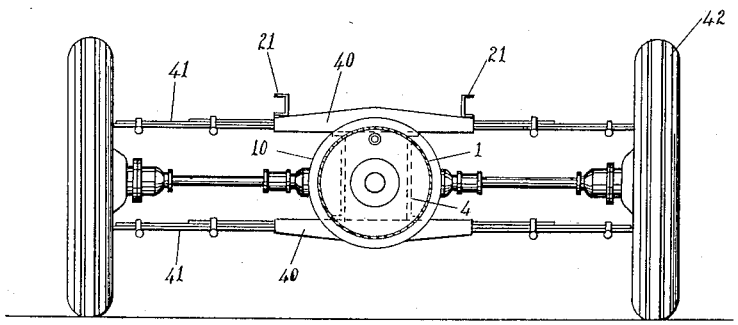
INVENTOR.
JAMES A. WRIGHT.
By.
ATTORNEY.

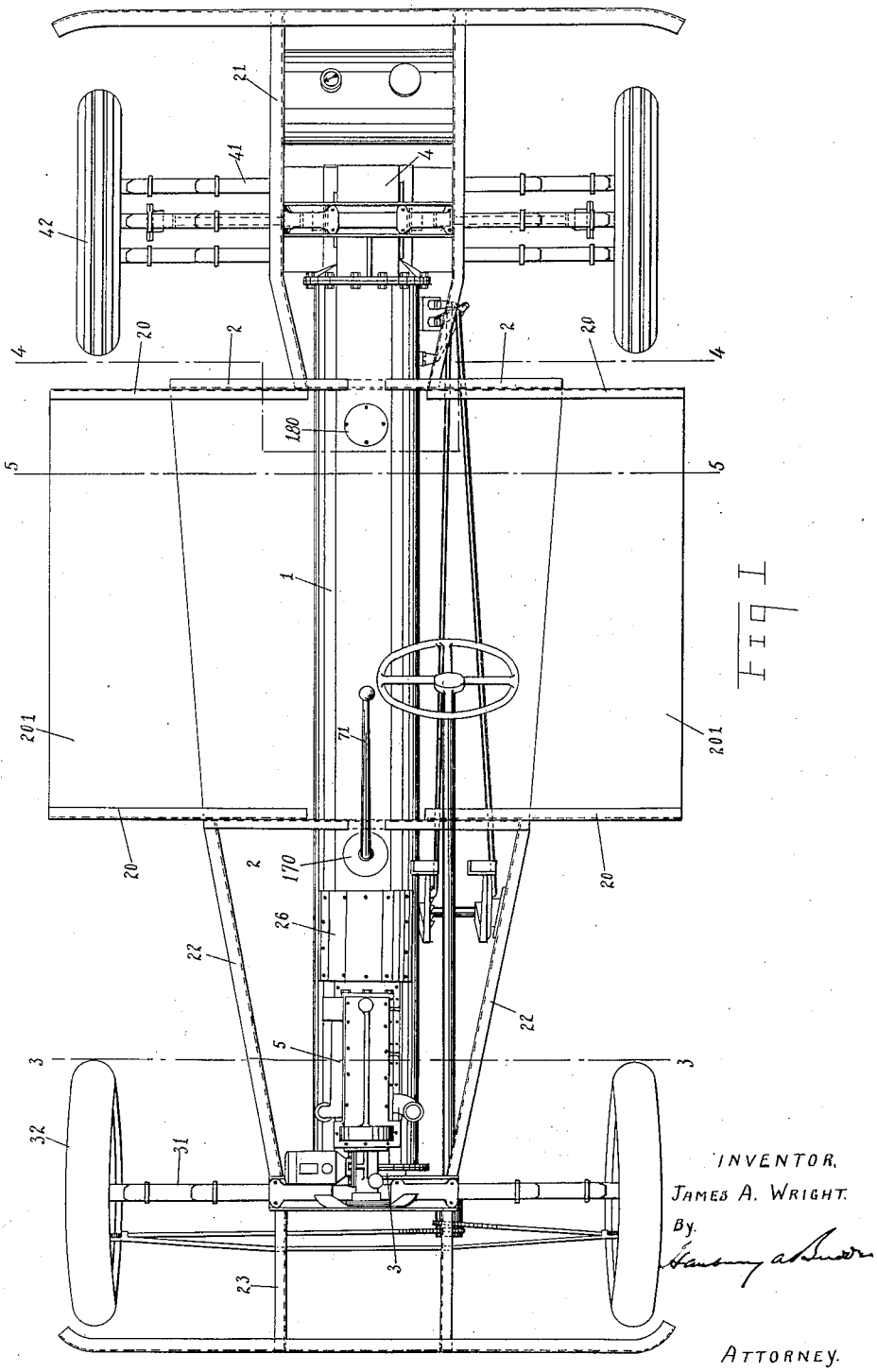

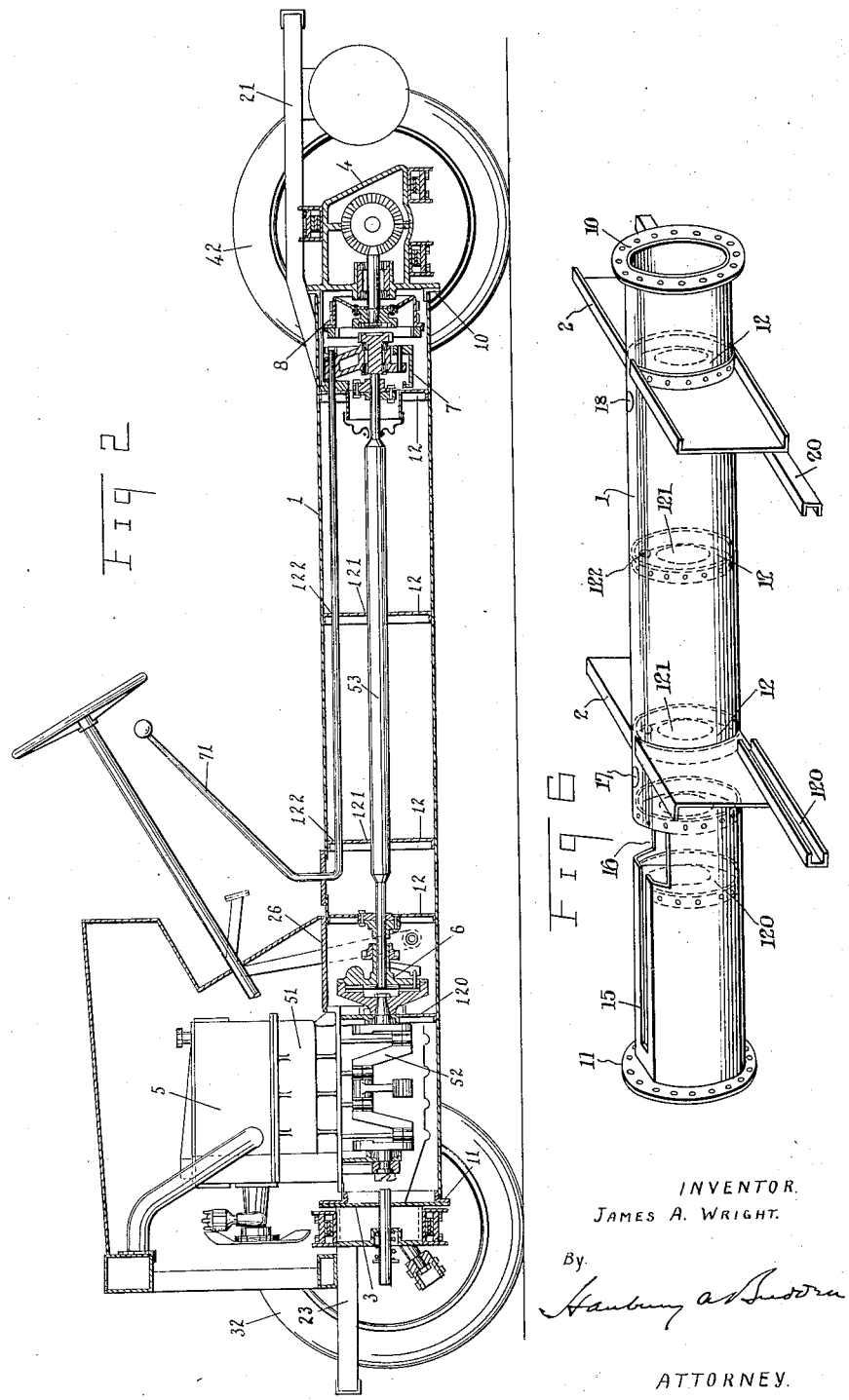

Patented Dec. 17, 1929

1,739,535

UNITED STATES PATENT OFFICE

JAMES A. WRIGHT, OF MONTREAL, QUEBEC, CANADA

VEHICLE CONSTRUCTION

Application filed November 8, 1926, Serial No. 146,978, and in Canada October 6, 1926.

My invention relates to the chassis of motor vehicles in which the wheels are journalled on transverse spring suspension, and particularly to improvements in the construction of the frame.

The improvement consists in replacing the usual frame with its side members and cross members by a central stem with brackets extending therefrom.

This stem forms a rigid construction with the front and rear transverse spring bearing elements, which provides a housing for the crank shaft, the fly wheel and clutch mechanism, the drive shaft, the transmission, the brake and the differential. This stem provides a central torque tube frame of great efficiency.

Secured to this rigid structure are transverse brackets and longitudinal brackets both forwardly and rearwardly, the whole forming a supporting frame for the car body and the various attachments thereto.

By this construction a great reduction in weight is obtained, while the weight of the superstructure is carried from the center line of the chassis. Furthermore owing to this rigid stem, the mechanism and body will be protected from torsional stresses and greater spring deflection will be permitted without affecting the frame.

This stem provides a central torque tube frame.

Reference is made to the accompanying drawings in which,

Fig. 1 is a plan view of the device.

Fig. 2 is a vertical cross section through the center line of Fig. 1.

Fig. 3 is a vertical transverse section of Fig. 1. on the line 3—3.

Fig. 4 is a vertical transverse section of Fig. 1. on the line 4—4.

Fig. 5 is a vertical transverse section of Fig. 1. on the line 5—5.

Fig. 6 is a perspective view of the stem and side brackets.

As shown in Figures 1 and 2, the front wheel yoke block 3, and the rear wheel differential casing or yoke block 4, are rigidly connected by a tube 1, shown in perspective in Figure 6.

The rear flange 10, of the tube 1, is secured directly to the flange of the casing or yoke block 4, while the front flange 11, is secured to the end plate carrying the block 3.

The front portion of the tube is longitudinally slotted at 15, and transversely at 16. The slot 15, forms a seat for the cylinder block 51, of the engine 5. The opening 16, which has a cover 26, removable when the clutch or fly wheel 6, are to be reached, is normally closed.

The opening 17, for the control rod 71, has a flexible cover 170. The opening 18, has a cover 180, and permits the transmission 7 to be reached.

The tube 1, is reinforced by the flanged plates 12, 12, which have a central aperture 121, and a side aperture 122.

The plate 120, forming the end of the crank case has its central aperture slotted upwardly to permit the entrance of the crank shaft and its bearings, as shown in Fig. 2.

When the cylinder block 51, is secured to the flanged edges of the slot 15, and the cover 26, is fastened over the opening 16, the stem form a continuous enclosing element.

Transverse brackets 2, 2, secured to the tube 1, carry the extension brackets 20, which support the running boards 201. Stay rods 22, connect the outer edges of the forward brackets 2, 2, with the block 3, and extend forwardly forming brackets 23 supporting the radiator and the bumper.

Longitudinal brackets 21, extend from the rear brackets 2, 2, and rest on the top of the spring carriers 40, secured to the top of the casing 4. These brackets carry the car body, fuel tank, spare wheel and bumper.

The forward transverse springs 31, and their carriers 30, are mounted on the yoke block 3, while the rear transverse springs 41, and their carriers 40, are mounted on the differential casing or yoke block 4.

The tube 1, houses the crank shaft 52, the clutch 6, the shaft 53, the transmission 7, the brake 8, and its extension the casing or yoke block 4 houses the differential.

The moving parts of the driving mechanism, except the pistons and rods, are entirely within the tube 1. The details of this mechanism can be modified or altered without affecting the scope of the invention.

By means of this concentration of mechanism, housing and frame in a central line, a great reduction in weight is secured, the heavy angle iron frame as now employed being replaced by a comparatively light tube of sheet metal.

The stem 1, forms a torque tube of great rigidity when reinforced by the diaphragms 12.

The brackets transfer the weight of the superstructure of the car to the central stem 1, and the springs 41, 41, 31, 31, distribute it to the wheels, 32, 42.

What I claim is:—

1. In a vehicle chassis construction, a central torque tube frame of sheet metal rigidly supported between front and rear yoke blocks, having transverse diaphragms therein and transverse brackets riveted through the sides of the tube to certain of the diaphragms.

2. In a vehicle chassis construction, a central torque tube frame of sheet metal rigidly supported between front and rear yoke blocks, having transverse diaphragms therein and transverse brackets riveted to the sides of the tube, and longitudinal brackets extending forwardly and rearwardly from the transverse brackets.

3. In a vehicle chassis construction, a central stem comprising a sheet metal tube with flanged ends, and front and rear yoke blocks to which the flanged ends are rigidly secured, with transverse sheet metal brackets riveted to the sides of the tube and longitudinal brackets extending forwardly and rearwardly from the brackets.

4. In a vehicle chassis construction, a central torque tube of sheet metal, rigidly supported between front and rear yoke blocks, transverse brackets riveted to the sides of the tube and longitudinal brackets extending from the transverse brackets and supported on spring seats on the yoke blocks.

JAMES A. WRIGHT.